United States Patent [19]

Aisch et al.

[11] 3,997,394
[45] Dec. 14, 1976

[54] FUEL ASSEMBLY SUPPORTING STRUCTURE

[75] Inventors: Friedrich-Wilhelm Aisch, Erlangen; Hans Peter Fuchs, Nurnberg; Diethelm Knödler, Erlangen; Alexander Steinke, Erlangen; Josef Steven, Erlangen, all of Germany

[73] Assignee: Kraftwerk Union Aktiengesellschaft, Mulheim (Ruhr), Germany

[22] Filed: Mar. 20, 1975

[21] Appl. No.: 560,387

[30] Foreign Application Priority Data

Mar. 20, 1974 Germany .......................... 2413464

[52] U.S. Cl. .................................. 176/78; 176/76; 176/87
[51] Int. Cl.² ......................................... G21C 3/30
[58] Field of Search ......................... 176/76, 78, 87

[56] References Cited

UNITED STATES PATENTS

| | | | |
|---|---|---|---|
| 3,646,994 | 3/1972 | Piepers et al. | 176/78 |
| 3,660,233 | 5/1972 | Dalke et al. | 176/78 X |
| 3,687,805 | 8/1972 | Desbois | 176/78 |
| 3,819,477 | 6/1974 | Frömel | 176/78 X |
| 3,828,868 | 8/1974 | Jabsen | 176/78 |
| 3,856,623 | 12/1974 | Kamo | 176/78 |
| R28,079 | 7/1974 | Andrews et al. | 176/76 X |

*Primary Examiner*—Samuel W. Engle
*Assistant Examiner*—Peter A. Nelson
*Attorney, Agent, or Firm*—Kenyon & Kenyon Reilly Carr & Chapin

[57] ABSTRACT

For use in forming the core of a pressurized-water reactor, a fuel assembly supporting structure for holding a bundle of interspaced fuel rods, is formed by interspaced end pieces having holes in which the end portions of control rod guide tubes are inserted, fuel rod spacer grids being positioned by these guide tubes between the end pieces. The end pieces are fastened to the end portions of the guide tubes, to integrate the supporting structure, and in the case of at least one of the end pieces, this is done by means which releases that end piece from the guide tubes when the end pieces receive an abnormal thrust force directed towards each other and which would otherwise place the guide tubes under a compressive stress that would cause them to buckle. The spacer grids normally hold the fuel rods interspaced by distances determined by nuclear physics, and buckling of the control rod guide tubes can distort the fuel rod spacer grids with consequent dearrangement of the fuel rod interspacing. A sudden loss of pressure in a pressurized-water reactor pressure vessel, can result in the pressurized coolant in the vessel, discharging from the vessel at such high velocity as to result in the abnormal thrust force on the end pieces of each fuel assembly, which could cause buckling of the control rod guide tubes when the end pieces are fixed to them in the normal rigid and unyielding manner.

6 Claims, 9 Drawing Figures

FUEL ASSEMBLY SUPPORTING STRUCTURE

BACKGROUND OF THE INVENTION

The core in the pressure vessel of a pressurized-water reactor, for example, is formed by a large number of fuel assemblies. Each assembly comprises a fuel assembly supporting structure holding a bundle of fuel rods laterally interspaced by distances determined by the nuclear physics involved.

Pressurized water circulates through the vessel and a reactor coolant system comprising one or more pipe loops each including a steam generator and coolant pump for maintaining the circulation. A loss-of-coolant accident, such as a serious break in any of the loops, results in a pressure drop in the pressure vessel, the coolant then discharging from the vessel at high velocity. In the event of such an accident, the reactor protective system causes control rods to drop into the core to effect a scram, while activating an emergency core cooling system which injects emergency water into the pressure vessel to flood the core and thereafter circulate the water enough to control the after-heating of the core. The emergency core cooling system is designed to function adequately if the interspacing between the fuel rods of each assembly, remains undisturbed, but difficulties occur if this interspacing is dearranged.

Each fuel assembly is formed by a fuel assembly supporting structure comprising vertically interspaced top and bottom end pieces which each comprise a flat horizontal plate which is perforated to pass the coolant and having a plurality of holes through which the end portions of vertical control rod guide tubes are inserted and fastened to the end pieces. Between the end pieces the guide tubes support fuel rod spacer grids, and the bundle of fuel rods is positioned with their designed interspacing by these grids. The guide tubes also function to receive and guide the control rods which can be inserted or raised as required, while guided by the guide tubes within the fuel bundle.

Normally the end portions of the control rod guide tubes are rigidly and unyieldingly fastened to the end pieces. These guide tubes are designed to safely resist buckling under the thrust force applied to them by the end pieces when the latter receive the force of the normal coolant flow which is upwardly against the bottom end piece and through its perforations, at least during normal reactor operations.

The pressure vessel contains a lower support structure and an upper support structure between which the fuel assemblies are held. In the event of a loss-of-coolant accident on the part of the reactor's coolant system, the coolant escaping from the reactor's pressure vessel can flow with high velocity upwardly or downwardly depending on the location of the break in the syste. In either event the coolant exerts a thrust force by way of the end pieces placing the control rod guide tubes under much greater compression than they are normally required to withstand. This thrust force may be only momentary, because the emergency core cooling system is activated promptly in the event of such an accident, but it can exert sufficient compressive stress on the control rod guide tubes to cause one or more of them to buckle, this distorting the fuel rod spacer grids held by the control rod guide tubes and, consequently, dearranging the interspacing between the fuel rods themselves. This makes it difficult to control the after-cooling by the emergency water.

SUMMARY OF THE INVENTION

To reduce the risk of such guide tube buckling, the present invention provides a fuel assembly supporting structure wherein at least at one of the end pieces, the guide tube end portions in the holes of that end piece, are fastened to that end piece by means for releasing it from the control rod guide tubes when the end pieces receive abnormal thrust forces directed towards each other. When a fuel assembly has this new supporting structure, the guide tubes are rigidly fastened to the end pieces under all normal service operating conditions. In the event of a loss-of-coolant accident, it produces the abnormal thrust driving the end pieces towards each other, resulting from a thrust force applied to either of the end pieces with the other end piece positioned by the fuel assembly supporting structure of the reactor pressure vessel, the end piece having the releasable interfastening means, releases from the guide tubes and moves at least slightly towards the other end piece. Both end pieces, of course, may be provided with such releasable means. Because a substantial thrust force is required to effect the release, a substantial amount of the thrust force of the coolant is initially dissipated, the release occurring just safely before the guide tubes receive compression in excess of their ability to carry the stress without buckling.

After the initial release, the released end piece or pieces may be driven into contact with the ends of the fuel rods held by the supporting structure, but when this occurs, much of the force applied to the end piece or pieces has been dissipated. It follows that with the guide tubes remaining straight and unbuckled, the tubes continue to hold the spacer grids without distortion of these grids and with the latter holding the fuel rods with their designed interspacing.

The releasable means may be formed by one or more metal elements positioned to be placed in shear when the end pieces receive the thrust force, this applying to the releasable means for any one control rod end portion in the hole of any one of the end pieces. Such a metal element may be formed by a bendable piece of metal or by a breakable shear pin or the like.

Conventionally, each control rod end portion has a shoulder or collar which engages the inside surface of that end portion's end piece, the other end of the control rod end portion projecting on the outside of the end piece with the latter clamped against the guide tube's collar or shoulder by a nut screwed on the projecting end of the guide tube portion.

To execute the present invention, the inner collar may be positioned by one or more bendable metal tags, or locked to the guide tube by one or more breakable shear pins. Control rod guide tubes are normally thin-walled, and according to this invention, a metal reinforcing sleeve is superimposed on each control rod guide tube end portion and inserted in the hole of the end piece involved. This sleeve is welded to the control rod guide tube and it is the sleeve that is provided with the collar, the outer end of the sleeve being threaded and provided with the usual nut. Such a sleeve can be rigidly and unyieldingly fastened to the end piece in the prior art manner and the welding between the sleeve and the control rod then designed to let go under the abnormal thrust force, but this involves the necessity for precision-welding techniques providing adequate holding under normal service conditions but released under the abnormal conditions.

The use of the sleeve does permit a simplified arrangement wherein the sleeve itself carries the shear elements with the end piece designed to cooperate with the elements.

BRIEF DESCRIPTION OF THE DRAWINGS

The presently preferred modes for carrying out this invention are illustrated somewhat schematically by the accompanying drawings, in which:

FIG. 3 is a longitudinal section showing details of one form of the present invention taken on the line A—A in FIG. 3a;

FIG. 4 shows a second form of the invention, this being a longitudinal section taken on the line B—B in FIG. 4a;

DETAILED DESCRIPTION OF THE INVENTION

Figure 1:
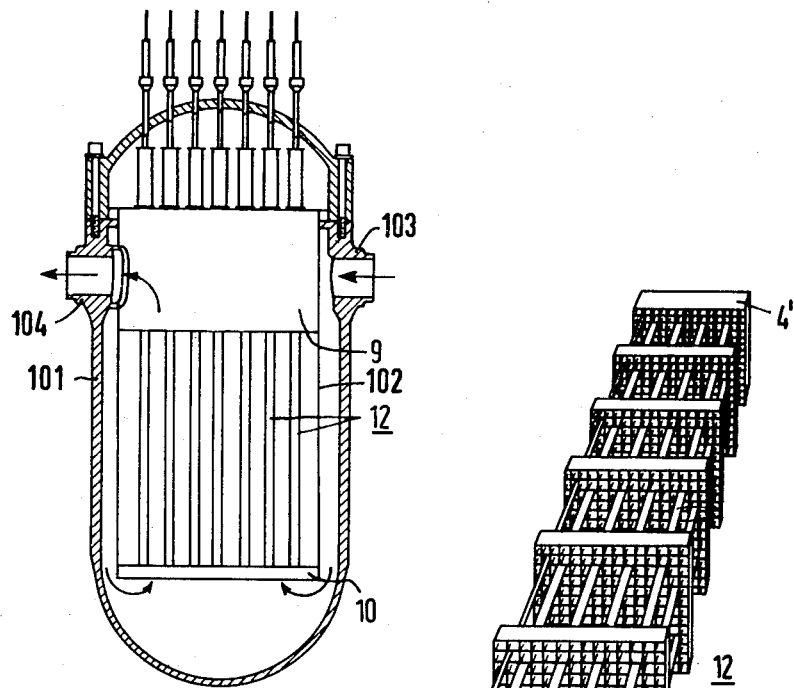
FIG. 1 is a vertical section showing the main components of a pressurized-water reactor.

As schematically shown by FIG. 1, a pressurized-water reactor includes a pressure vessel 101 enclosing a core made up of a plurality of vertical fuel assemblies 12. Upper and lower support structures 9 and 10 support the top and bottom of each assembly, the support structures being positioned inside of a core barrel 102 which is suspended within the vessel. In operation, the coolant system loop delivers the pressurized-water coolant to the nozzle 103, the coolant going downwardly between the outside of the core barrel 102 and the inside of the vessel 101, turning at the bottom and traveling upwardly through the core formed by the assemblies 12 and through the upper support structure 9 to exit by way of an opening in the core barrel, through the nozzle 104. The coolant circulating track is shown by the arrows in FIG. 1.

As previously described, a break in the coolant system drops the pressure on the coolant in the vessel with the coolant discharging at high velocity through either or both of the nozzles 103 and 104, going in the direction of the break where the pressure loss is occurring. The coolant flow through the core barrel 102 occurs at very high velocity, at least initially in the case of a loss-of-coolant accident on the part of the reactor coolant system.

Figure 2:
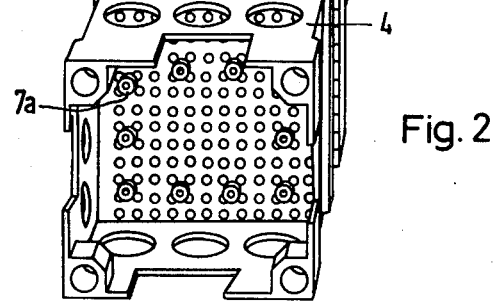
FIG. 2 is a perspective view showing a typical fuel assembly supporting structure to which the prinicples of this invention can be applied.

In FIG. 2 a conventional fuel assembly supporting structure 12 is shown, and it may be any of those shown at 12 in FIG. 1. The bottom end piece is shown at 4 and the top end piece at 4', these being vertically interspaced by the interconnecting control rod guide tubes 7 normally having the rigid unyielding connections with the end pieces by way of fixed inner collars (not shown), the ends extending outwardly to the outsides of the end pieces and as shown in the case of the bottom end piece 4 being provided with nuts 7a screwed on their ends. The guide tubes serve as structural connecting rods between the end pieces and also, as required, to receive the control rods which can be inserted or removed via the guide tubes, as required. The interspaced fuel rod spacer grids are shown at 8 between the end pieces and supported by the guide tubes 7 which extend through appropriate mesh openings of the spacer grids. As shown in the case of the bottom end piece 4, it can be seen that these end pieces are formed by flat horizontal plates, suitably perforated for the passage of the coolant upwardly through the fuel rods whose interspacing should be accurately determined by the mesh patterns of the spacer grids 8, the fuel rods themselves not being shown in FIG. 2.

Now it can be seen that a high velocity flow, much greater than normal, through the core formed by the assemblies 12, can thrust the bottom end pieces 7a upwardly with the top end pieces 4' held by the structure 9, or downwardly with the bottom end pieces 7a then held by the structure 10. In either case, the effect is that the end pieces are thrust towards each other, this placing the guide tubes 7 in compression. These guide tubes 7 are, of course, designed to resist the compression they operate under when the reactor is functioning normally; the guide tubes 7 are not designed to remain rigid against buckling in the event of a loss-of-coolant accident resulting in abnormal thrust forces on the end pieces and consequently abnormal compression stress on the guide tubes. Under such abnormal conditions, it is possible for one or more of the guide tubes 7 to buckle, consequently dearranging one or more of the spacer grids 8 and consequently, destroying the designed interspacing between any fuel rods positioned in the meshes of the spacer grids.

As previously described, the present invention provides fastenings between the ends of the control rod guide tubes and one or both of the end pieces, which release when the end pieces are subjected to abnormal thrust forces directed from one end piece towards the other so as to place the guide tubes under compression.

Figure 3:
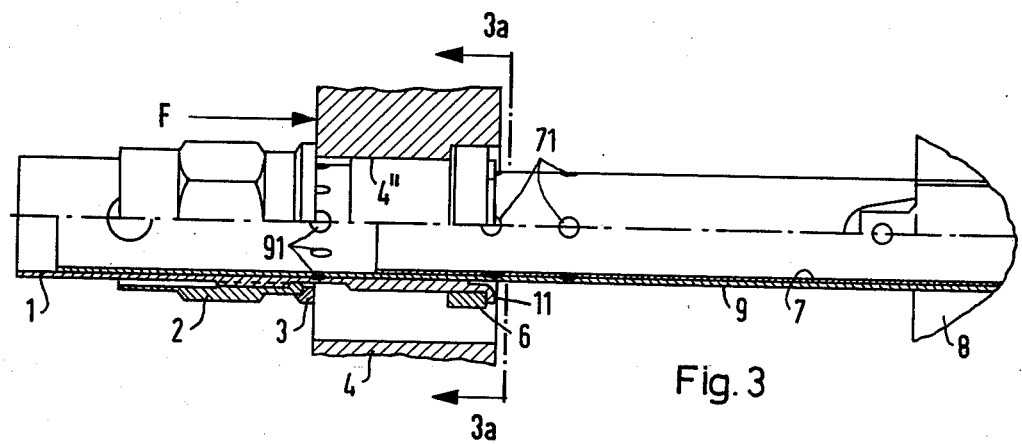
Figure 3A:
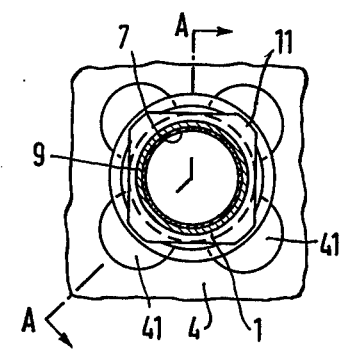
FIG. 3a is a cross section taken on the line 3a—3a in FIG. 3.

One specific example of the invention is illustrated by FIGS. 3 and 3a. The guide tube 7, only partially shown, is illustrated as having its end inserted through one of the holes 4", in this case formed through the bottom end piece 4. The guide tube 7 is illustrated as being provided with an extension 9, the two parts being integrated by spot-welding 71. The end of the guide tube has the superimposed sleeve 1 which extends through the hole 4" and is fixed to the guide tube by spot-welds 91. On the outside or bottom side of the end piece 4, a washer 3 and the usual nut 2 is provided, this nut being screwed onto threads formed on the sleeve 1.

However, on the inside or top side of the end piece 4 a washer 6 is positioned in a recess formed in that side of the end piece, and this inner end of the sleeve 1 has outwardly bent tabs 11 engaging the washer 6. Tightening of the nut 2, firmly clamps the end piece 4 against the tabs 11.

Incidentally, the washer 6 is provided because the hole 4" has portions interrupted by holes 41 formed through the end piece 4 to provide coolant flow passages, this leaving only four cylindrical segments engaging the sleeve 1, the washer 6 providing a bearing engaging these portions.

The tabs 11 are designed to hold the end piece 4 against upward displacement under normal coolant flow conditions in the reactor pressure vessel 101. Of necessity, all of the parts described are made of metal, and knowing the wall thickness of the tabs 11 and the bendability of the metal involved, and knowing the maximum compression the control rod guide tube can carry without buckling, it is possible to design the tabs 11 to bend in the axial direction of the guide tubes 7 only when the thrust force on the end piece 4, indicated by the arrow F, approaches a value that would cause buckling of the guide tube. The deformation of the metal tabs 11 that then occurs absorbs a great deal of the energy of the thrust force and should the end piece engage the ends of the fuel rods (not shown), the end piece has little energy left in it to cause appreciable damage to the fuel rods. As previously indicated, in the case of a loss-of-coolant accident, the high velotity flow of coolant in the pressure vessel, occurs only momentarily.

Figure 3B:
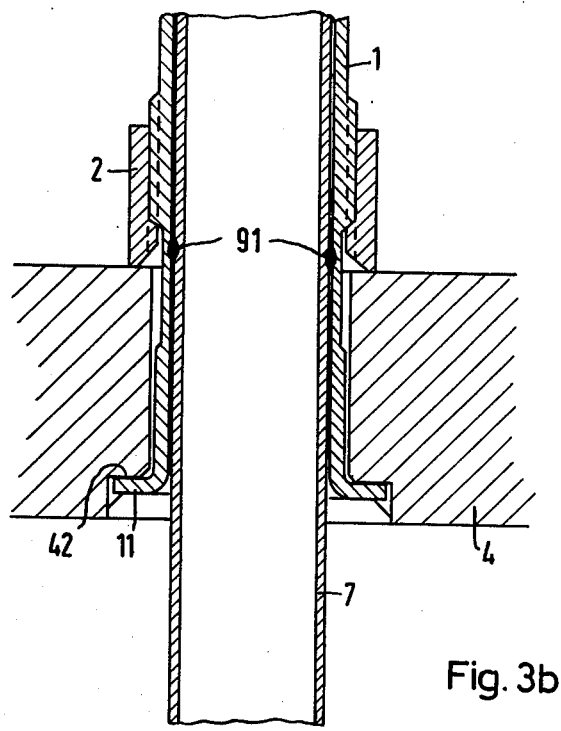
FIG. 3b completely in longitudinal section shows a modification of FIG. 3.

FIG. 3b serves to show a simplification wherein the washers 3 and 6 are eliminated, the tabs 11 bearing directly against the inside of the end piece 4 by way of a recess surface 42 formed in the inside of the end piece.

Figure 4:
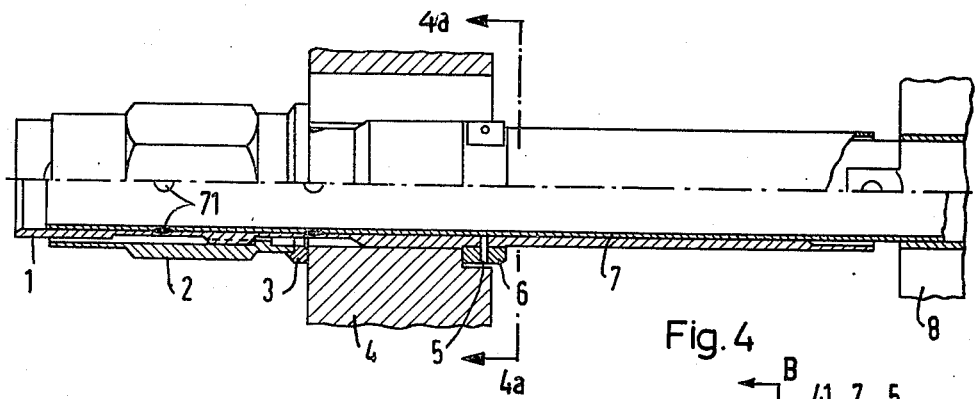
Figure 4A:
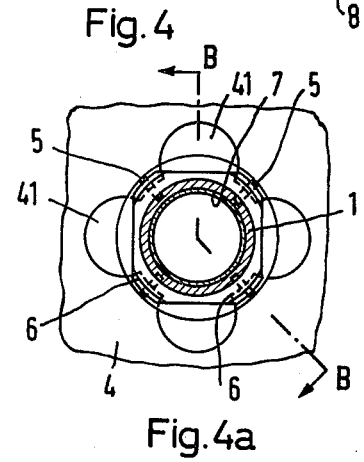
FIG. 4a is a cross section taken on the line 4a—4a in FIG. 4.

In FIGS. 4 and 4a essentially the same parts are shown excepting that in this instance the sleeve 1 and the washer 6 have radial holes in which shear pins 5 are positioned to releasably lock the parts together. In this case abnormal force results in shearing of the shear pins 5.

Figure 4B:
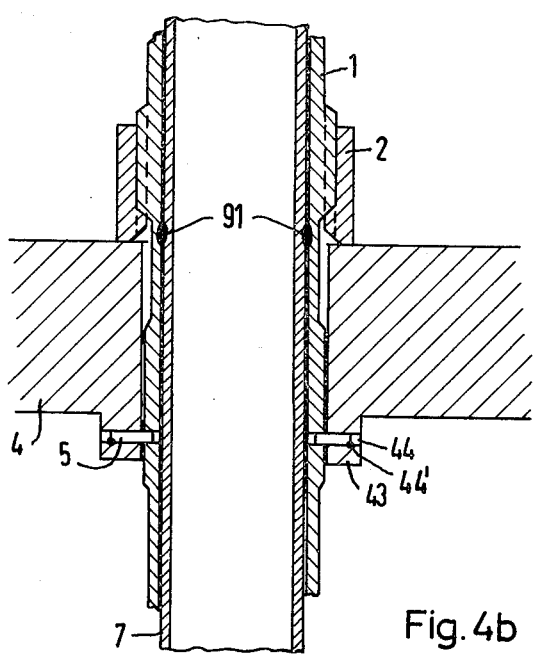
FIG. 4b in longitudinal section shows a modification of FIG. 4.

Again, as in the case of FIG. 3b, FIG. 4b shows that the washers 3 and 6 can be eliminated, the inside of the end piece 4 being flanged and formed with radial holes 44 in which the shear pins 5 are positioned and locked in position by welds 44'. The flange is shown at 43.

Figure 5:
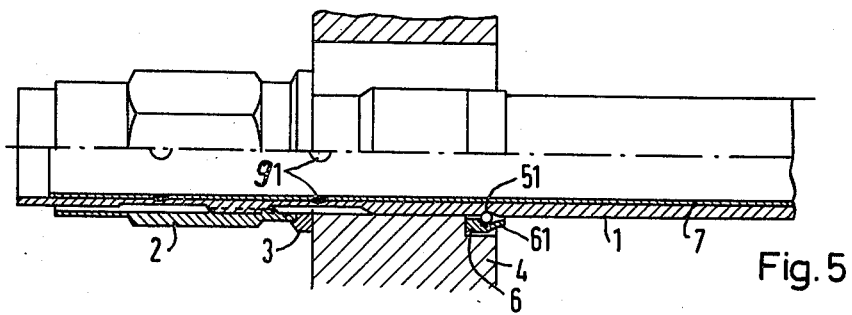
FIG. 5 is a view similar to FIGS. 3 and 4 but showing another example of the invention.

In FIG. 5 the sleeve 1 is formed with detents engaged by balls 51, the washer 6, in this instance, having an inwardly extending lip 61 which is elastically deformable and resiliently holds the balls 51 in the detents in the sleeve 1.

In all cases, the tabs 11, the shear pins 5, and the resiliently held balls 51, are designed so that the fuel assembly supporting structure involved is held integrated together as firmly as usual when operating under a normal coolant flow force in the pressure vessel of the reactor. However, if the coolant flow force increases to a degree introducing tube buckling compressive force to the control rod guide tubes, the design of each of the releasable means would be such as to then let go and permit the end piece to move axially with respect to the guide tubes during the momentary period involved. Since the control rod guide tubes, which function as connecting rods between the two end pieces, do not buckle, the spacer grids 8 remain undisturbed without relative movement between them, the control rod guide tubes, and the fuel rods held by the spacer grid. With the fuel rod interspacing undisturbed, the introduction of emergency core cooling water to the core, can effectively control after-cooling of the core following a core scram or shutdown.

What is claimed is:

1. A fuel assembly supporting structure comprising interspaced end pieces having holes formed therethrough, rods having ends positioned in said holes, fuel rod spacer grids positioned between said end pieces by said rods, and releaseable means for fastening the rods to said end pieces and which means at least at one of the end pieces releases that end piece, enabling said end piece to slide axially with respect to said rods when the end pieces receive abnormal thrust forces directed towards each other.

2. The structure of claim 1 in which the releasable means includes one or more elements positioned to be placed in shear when said end pieces receive said thrust force.

3. The structure of claim 2 in which said rods are in the form of control-rod guide tubes and the releasable means includes sleeves superimposed over the ends of the guide tubes in the end piece holes, said elements connecting said sleeves with the inside of said one of the end pieces and the sleeves on the outside of that end piece having means for engaging said outside.

4. The structure of claim 3 in which said sleeves have outwardly bent tabs formed said elements.

5. The structure of claim 3 in which said sleeves have radial holes and shear pins in these radial holes, the shear pins connecting with said inside and forming said elements.

6. The structure of claim 3 in which said sleeves have detents, balls are positioned in said detents and said balls have means for holding them resiliently in the detents and for connecting the balls with said inside to thereby form said elements.

* * * * *